(12) United States Patent
Wang et al.

(10) Patent No.: US 11,956,528 B2
(45) Date of Patent: Apr. 9, 2024

(54) SHOOTING METHOD USING TARGET CONTROL, ELECTRONIC DEVICE, AND STORAGE MEDIUM

(71) Applicant: BEIJING ZITIAO NETWORK TECHNOLOGY CO., LTD., Beijing (CN)

(72) Inventors: Xingyi Wang, Beijing (CN); Zhou Yu, Beijing (CN)

(73) Assignee: BEIJING ZITIAO NETWORK TECHNOLOGY CO., LTD. (CN)

( * ) Notice: Subject to any disclaimer, the term of this patent is extended or adjusted under 35 U.S.C. 154(b) by 0 days.

(21) Appl. No.: 17/887,877

(22) Filed: Aug. 15, 2022

(65) Prior Publication Data

US 2022/0394191 A1     Dec. 8, 2022

Related U.S. Application Data

(63) Continuation of application No. PCT/CN2021/120367, filed on Sep. 24, 2021.

(30) Foreign Application Priority Data

Sep. 30, 2020    (CN) .......................... 202011063435.2

(51) Int. Cl.
    *H04N 23/63*        (2023.01)
    *H04N 5/222*        (2006.01)
    (Continued)

(52) U.S. Cl.
CPC ......... *H04N 23/632* (2023.01); *H04N 5/2621* (2013.01); *H04N 23/635* (2023.01); *H04N 23/64* (2023.01); *H04N 5/2222* (2013.01)

(58) Field of Classification Search
CPC .. H04N 23/632; H04N 5/2621; H04N 23/635; H04N 23/64; H04N 5/2222; H04N 23/62; H04N 23/631; H04N 5/262
(Continued)

(56) References Cited

U.S. PATENT DOCUMENTS

2007/0081740 A1*   4/2007   Ciudad .............. H04N 1/00453
                                                   382/276
2008/0307307 A1*   12/2008   Ciudad .................... G06T 13/80
                                                   715/719
(Continued)

FOREIGN PATENT DOCUMENTS

AU          2020100720 A4      6/2020
CN           108052670 A       5/2018
(Continued)

OTHER PUBLICATIONS

International Search Report dated Oct. 27, 2021 in International Application No. PCT/CN2021/120367.
(Continued)

*Primary Examiner* — Usman A Khan

(57) ABSTRACT

A shooting method includes the following steps. A shooting page including a control region and a main display region is displayed, where the control region is used to display at least two effect controls, a more effect control, and a main shooting control, the at least two effect controls correspond to recommended effects according to a preset recommendation parameter; in response to a target slide operation in the main display region, the controls is moved along a sliding direction of the target slide operation, a target control is determined according to the target slide operation; in response to the target control being one effect control, a preview of a target effect corresponding to the target control is displayed on the shooting page, and capturing is per-
(Continued)

formed using the target effect in response to a first trigger operation on the trigger position.

14 Claims, 11 Drawing Sheets

(51) Int. Cl.
  *H04N 5/262* (2006.01)
  *H04N 23/60* (2023.01)
(58) Field of Classification Search
  USPC .......................................................... 348/239
  See application file for complete search history.

(56) References Cited

U.S. PATENT DOCUMENTS

| | | | | |
|---|---|---|---|---|
| 2009/0262218 | A1* | 10/2009 | Makii | H04N 5/53 |
| | | | | 348/333.01 |
| 2012/0163659 | A1* | 6/2012 | Asakura | H04N 23/632 |
| | | | | 348/E5.051 |
| 2012/0268615 | A1* | 10/2012 | Choi | H04N 5/2621 |
| | | | | 348/240.99 |
| 2012/0307112 | A1* | 12/2012 | Kunishige | H04N 5/2621 |
| | | | | 348/E5.051 |
| 2013/0088618 | A1* | 4/2013 | Kunishige | H04N 23/62 |
| | | | | 348/E5.051 |
| 2014/0098273 | A1* | 4/2014 | Ito | H04N 23/62 |
| | | | | 348/333.03 |
| 2017/0169662 | A1* | 6/2017 | Froy | G06Q 30/0261 |
| 2021/0321046 | A1* | 10/2021 | Zhao | H04N 5/772 |
| 2021/0360168 | A1* | 11/2021 | Zhao | H04N 23/632 |

FOREIGN PATENT DOCUMENTS

| | | |
|---|---|---|
| CN | 108668164 A | 10/2018 |
| CN | 108965705 A | 12/2018 |
| CN | 110865754 A | 3/2020 |
| CN | 111371993 A | 7/2020 |
| CN | 112135059 A | 12/2020 |
| JP | 2012134873 A | 7/2012 |
| JP | 2015146619 A | 8/2015 |
| JP | 2019197519 A | 11/2019 |
| KR | 20180041366 A | 4/2018 |
| KR | 20190124597 A | 11/2019 |
| KR | 20190142397 A | 12/2019 |
| WO | 2019217003 | 11/2019 |
| WO | 2020015333 A1 | 1/2020 |
| WO | 2020055613 A1 | 3/2020 |

OTHER PUBLICATIONS

First Office Action dated May 8, 2021 in Chinese Patent Application No. 202011063435.2 (5 pages) with an English translation (5 pages).
Happy Christmas Beauty Camera Version 2.0 UI interface has a new look (2 pages) with an English translation (3 pages), 2013.
Office Action dated Aug. 24, 2023 in Indian Application No. 202227048890, with English translation (7 pages).
Office Action dated Jul. 14, 2023 in European Application No. 21874358.1 (6 pages).
Office Action dated Jun. 14, 2023 in Japanese Application No. 2022-549157, English translation (pp. 6).
European Search Report dated Jun. 5, 2023 in European Application No. 21874358.1 (pp. 4).
Office Action dated Nov. 15, 2023 in Korean Application No. 10-2022-7028637, with English translation (11 pages).

* cited by examiner

SHOOTING METHOD USING TARGET CONTROL, ELECTRONIC DEVICE, AND STORAGE MEDIUM

CROSS-REFERENCE TO RELATED APPLICATION(S)

This is continuation of International Patent Application No. PCT/CN2021/120367, filed on Sep. 24, 2021, which claims priority to Chinese Patent Application No. 202011063435.2 filed with the China National Intellectual Property Administration (CNIPA) on Sep. 30, 2020, the disclosure of which is incorporated herein by reference in its entirety.

TECHNICAL FIELD

The present disclosure relates to the field of computer technologies, for example, a shooting method and apparatus, an electronic device, and a storage medium.

BACKGROUND

With the development of electronic technology and the improvement of the shooting performance of mobile smart terminals, more and more users begin to use application programs with shooting functions installed in the mobile smart terminals to perform shooting.

To improve the image quality and visual effect of an image acquired by a camera of a smart terminal, the user generally adds effects to the image. When the shoot effects are added to the application program with the shooting function, the user needs to click on a function button on a shooting page to expand an effect selection panel and click on an effect icon of an effect the user wants to use in the effect selection panel to switch the effects in the image.

However, in a method for adding effects in the related art, the user needs to perform multiple click operations to switch the effects, resulting in a relatively high operation cost.

SUMMARY

The present disclosure provides a shooting method and apparatus, an electronic device, and a storage medium, so as to reduce an operation cost when effects are switched.

The present disclosure provides a shooting method. The method includes steps described below.

A current display page is displayed and controls are displayed in a control region of the current display page, where the controls include a main shooting control and at least two effect controls for recommending effects.

In response to a target slide operation acting on a main display region of the current display page, each of the controls displayed in the control region is moved along a sliding direction of the target slide operation, and a target control is determined when an end of the target slide operation is detected, where the target control is a control located at a trigger position in the control region when the target slide operation ends.

In response to the target control being one of the at least two effect controls, a shooting page is displayed, a preview of a target effect corresponding to the target control is displayed on the shooting page, and in response to a first trigger operation acting on the trigger position, shooting is performed by using the target effect.

In response to the target control being the main shooting control, the shooting page is displayed, and in response to a second trigger operation acting on the trigger position, shooting is performed.

The present disclosure further provides an electronic device. The electronic device includes one or more processors and a memory configured to store one or more programs.

The one or more programs, when executed by the one or more processors, cause the one or more processors to perform the preceding shooting method.

The present disclosure further provides a computer-readable storage medium storing a computer program which, when executed by a processor, causes the processor to perform the preceding shooting method.

DETAILED DESCRIPTION

Embodiments of the present disclosure are described hereinafter with reference to the drawings. The drawings illustrate some embodiments of the present disclosure, but the present disclosure may be implemented in various manners and should not be construed as limited to the embodiments set forth herein. These embodiments are provided for ease of thorough and complete understanding of the present disclosure.

The various steps recited in method embodiments of the present disclosure may be performed in a different order and/or in parallel. In addition, the method embodiments may include additional steps and/or omit execution of illustrated steps. The scope of the present disclosure is not limited in this respect.

As used herein, the term "comprise" and variations thereof are intended to be inclusive, that is, "including, but not limited to". The term "based on" is "at least partially based on". The term "an embodiment" refers to "at least one embodiment"; the term "another embodiment" refers to "at least one another embodiment"; the term "some embodiments" refers to "at least some embodiments". Related definitions of other terms are given in the description hereinafter.

Concepts such as "first" and "second" in the present disclosure are merely intended to distinguish one from another apparatus, module, or unit and are not intended to limit the order or interrelationship of the functions performed by the apparatus, module, or unit.

"One" and "a plurality" mentioned in the present disclosure are illustrative, are not intended to limit the present disclosure, and should be understood as "one or more" unless expressed in the context.

The names of messages or information exchanged between multiple apparatuses in embodiments of the present disclosure are only for illustrative purposes and are not intended to limit the scope of such messages or information.

Figure 1:
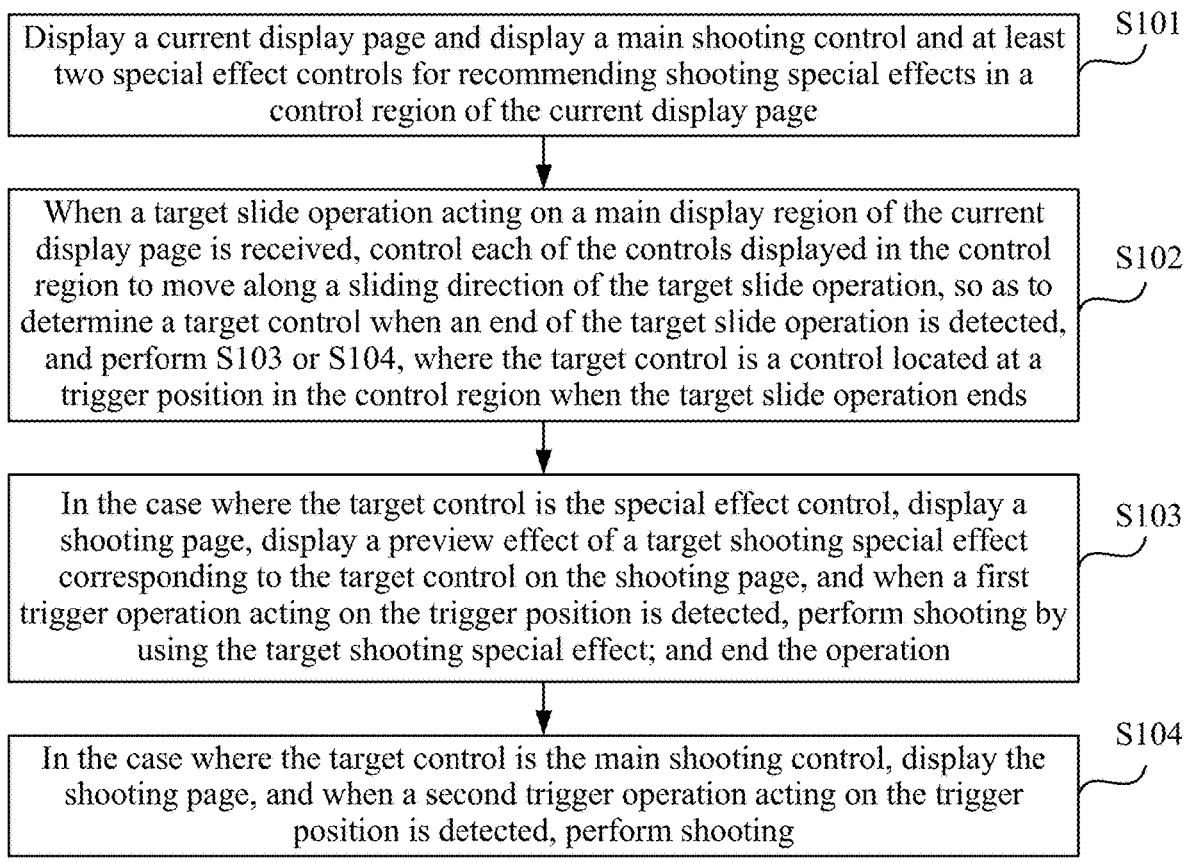
FIG. 1 is a flowchart of a shooting method according to an embodiment of the present disclosure.

FIG. 1 is a flowchart of a shooting method according to an embodiment of the present disclosure. This method may be performed by a shooting apparatus, where the apparatus may be implemented by software and/or hardware and may be configured in an electronic device, for example, a smart phone or a tablet computer. Optionally, the shooting method provided in the embodiment of the present disclosure is applicable to a scenario in which effects added in a shooting page are switched during shooting. As shown in FIG. 1, the shooting method provided in this embodiment may include steps described below.

In S101, a current display page is displayed and controls are displayed in a control region of the current display page, where the controls include a main shooting control and at least two effect controls for recommending effects.

The current display page may be a shooting page of an application program with a shooting function or another page to which the shooting page may be switched through one or more slide operations, for example, a local photo album page for displaying photos locally stored by the electronic device, a shooting-the-same page for displaying sticker templates of the application program and/or a My Album page for displaying albums local to the electronic device. The main shooting control may be understood as a control used for shooting in a no-effect mode, that is, when it is detected that the main shooting control is located at a trigger position of the control region, or when it is detected that the user clicks on or presses the main shooting control, the electronic device does not add the effect to the shooting page. The effect may be understood as a dynamic prop or a static prop that can be added to an image acquired by a camera, such as animation or a sticker. A target recommended effect may be understood as a recommended effect corresponding to a target control. The effect control is a control used for adding the corresponding effect set by the application program. When it is detected that a effect control is located at the trigger position of the control region, or when it is detected that the user clicks on or presses on an effect control, the electronic device adds the effect corresponding to the effect control to the shooting page. The main shooting control and at least two effect controls may form a horizontal control queue or a vertical control queue. The case where the main shooting control and the at least two effect controls form the horizontal control queue is used as an example for description below.

Figure 2:
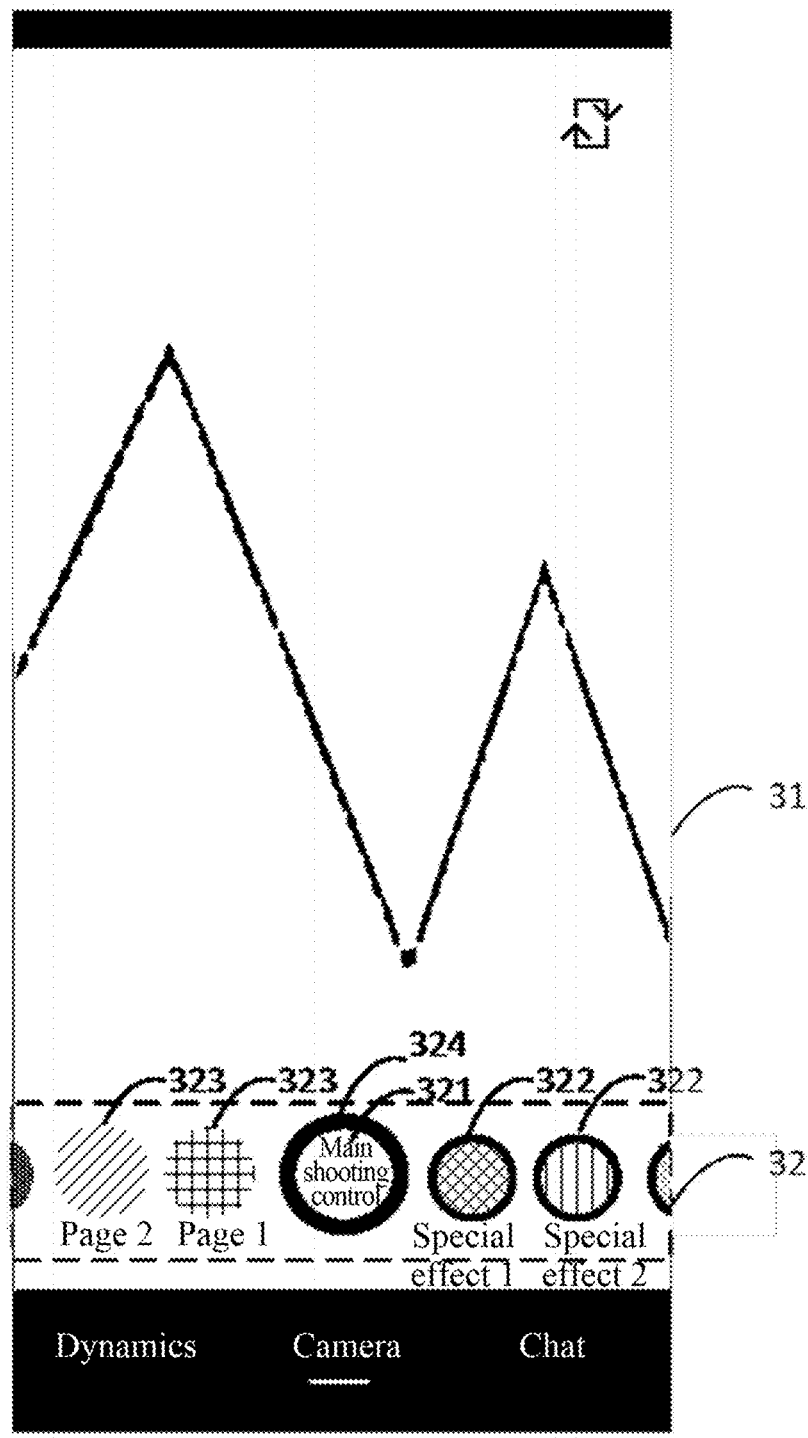
FIG. 2 is a schematic view of a shooting page according to an embodiment of the present disclosure.
Figure 3:
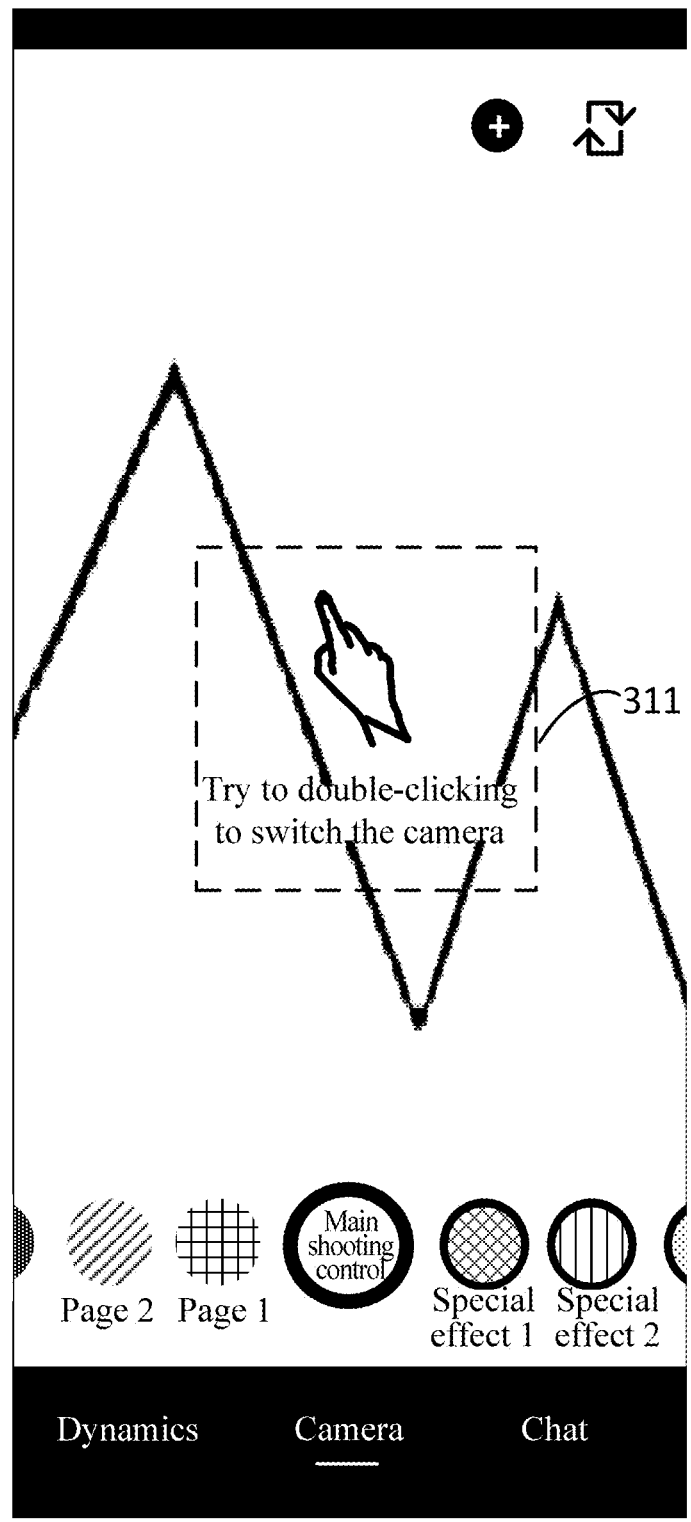
FIG. 3 is a schematic view of camera switching prompt information according to an embodiment of the present disclosure.

Exemplarily, as shown in FIG. 2 (the case where the current display page is the shooting page is used as an example in FIG. 2), the current display page may include a main display region 31 for displaying main display content (such as the image acquired by the camera, the sticker templates, and locally stored photos or albums) that should be displayed on this display page and a control region 32 for displaying controls. A main shooting control 321 and at least two effect controls 322 may be displayed in the control region 32. In an embodiment, in order for the user to understand the function that the application program can recommend different effects to the user when type information of the camera is different, as shown in FIG. 3, when the shooting page is displayed for a certain number of times and then displayed again, camera switching prompt information 311 may be displayed to the user on the shooting page. For example, the current display page is the shooting page, and after the current display page is displayed and the main shooting control, the at least two effect controls for recommending the effects, and at least two page controls for displaying pages are displayed in the control region of the current display page, the method further includes: if the shooting page displayed this time is displayed for the n-th time, the camera switching prompt information 311 is displayed on the shooting page to prompt the user to switch the camera to switch the effect controls in the control region, where n is a positive integer and n≥2. Here, n may be set as required. For example, n may be set to 5 or 10 or the like. Correspondingly, when the shooting page is displayed for the fifth time or when the shooting page is displayed for the tenth time, the camera switching prompt information 311 may be displayed to the user on the shooting page; and when it is detected that the user replaces the effect controls in the horizontal control queue after switching the camera, a current control at the trigger position may or may not be replaced.

The electronic device displays the current display page when detecting an operation of starting an application program or an operation of switching pages by a target slide operation. For example, the electronic device may display the shooting page of the application program when detecting the operation of starting the application program; or the electronic device displays a target display page corresponding to the target slide operation when detecting the operation of switching pages by the target slide operation.

Figure 4:
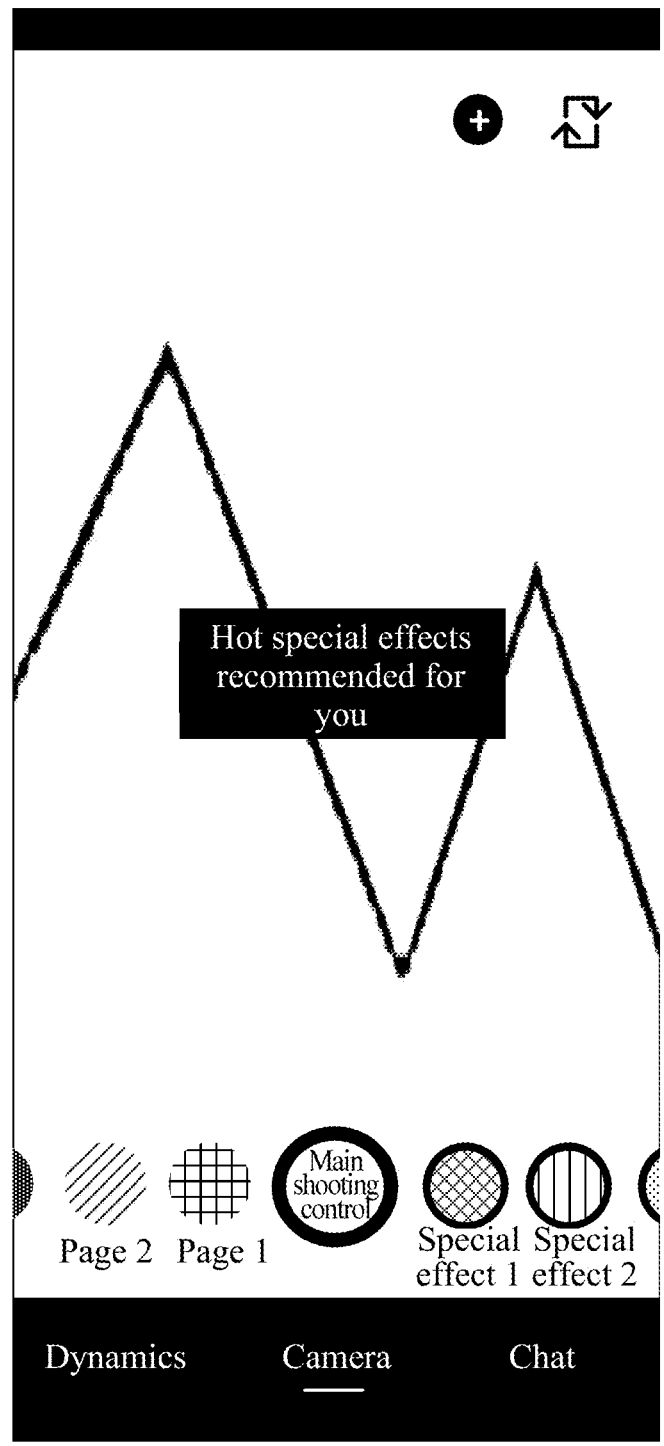
FIG. 4 is a schematic view of prop switching prompt information according to an embodiment of the present disclosure.
Figure 5:
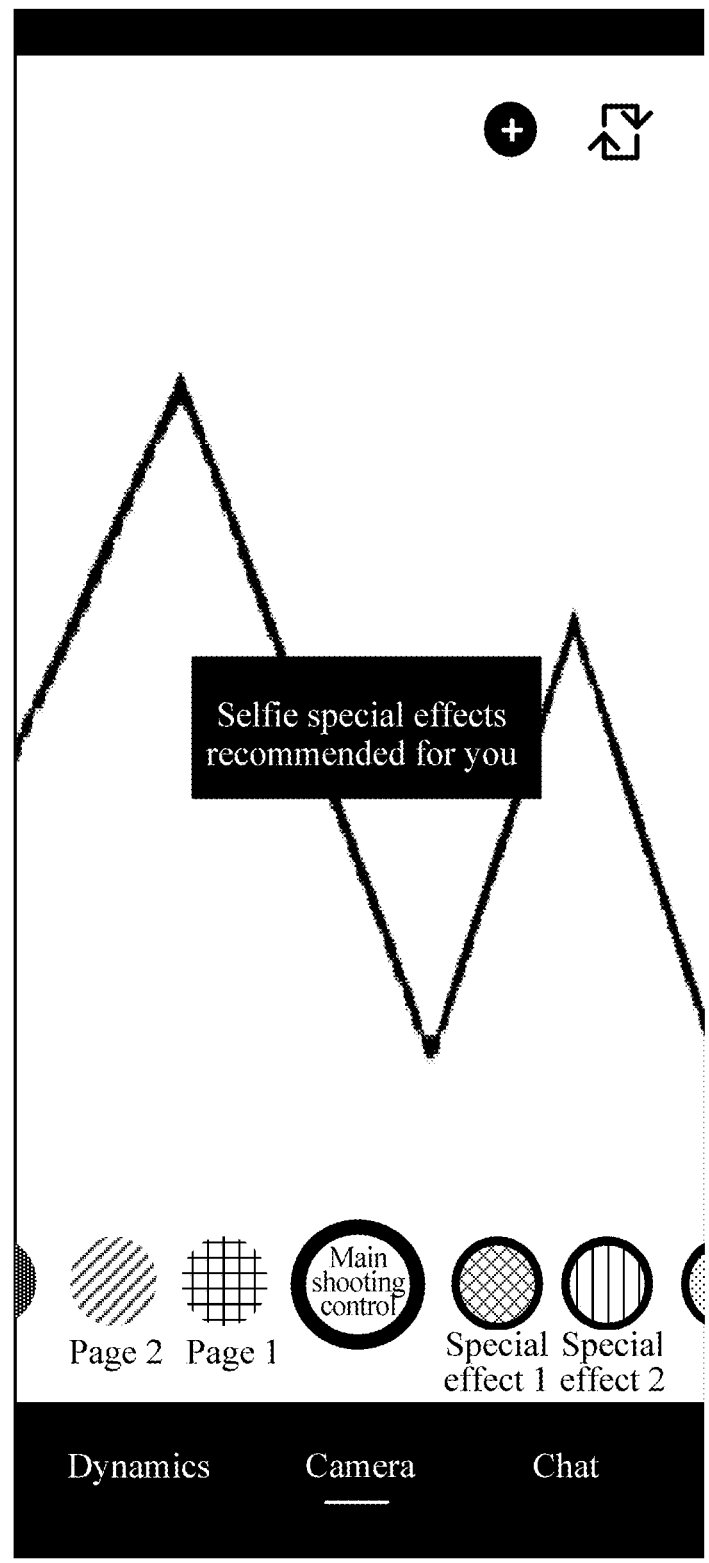
FIG. 5 is a schematic view of prop switching prompt information of another type according to an embodiment of the present disclosure.

In the preceding embodiments, after the camera is switched, prop switching prompt information may also be displayed on the shooting page, so as to remind the user of recommended prop update by the prop switching prompt information. When switching from a front camera to a rear camera and when switching from the rear camera to the front camera, the electronic device may display the prop switching prompt information of the same content or may display the prop switching prompt information of different contents. For example, as shown in FIG. 4, when switching from the front camera to the rear camera, the electronic device may display content related to recommended effects after the electronic device switches to the rear camera in the prop switching prompt information, such as "Hot effects recommended for you". As shown in FIG. 5, when switching from the rear camera to the front camera, the electronic device may display content related to the recommended effects after the electronic device switches to the front camera in the prop switching prompt information, such as "Selfie effects recommended for you".

In S102, when a target slide operation acting on a main display region of the current display page is received, each of the controls displayed in the control region is moved along a sliding direction of the target slide operation, so as to determine a target control when an end of the target slide operation is detected, and S103 or S104 is performed, where the target control is a control located at a trigger position in the control region when the target slide operation ends.

The trigger position may be a sub-region used for responding to a trigger operation of the user in the control region. Position coordinates of the trigger position may be preset. For example, the trigger position may be a sub-region located on the left, right or middle of the control region and may be a circular sub-region 324 located in the middle of the control region 32 as shown in FIG. 2. The current control may be understood as a control located at the trigger position of the control region when the target slide operation is received, that is, a control located at the trigger position of the control region before this step is performed. The target control is a control that is adjacent to the current control in the horizontal control queue and corresponds to the sliding direction of the target slide operation. For example, when the target slide operation is a slide operation to the right, the target control may be a control to the left of the current control and adjacent to the current control in the horizontal control queue; and when the target slide operation is a slide operation to the left, the target control may be a control to the right of the current control and adjacent to the current control in the horizontal control queue.

The target slide operation may be understood as a slide operation whose slide type is a set slide type. The set slide type may be horizontal slide (that is, sliding to the left or right on the screen of the electronic device), vertical slide (that is, sliding upward or downward on the screen of the electronic device), or slide in an oblique direction whose an angle relative to the horizontal slide is within a set angle range. The case where the target slide operation is the horizontal slide operation is used as an example for description below.

When the user wants to add the effect to the shooting page for a preview or wants to replace the effect for a preview on the shooting page, the user may slide horizontally in the main display region of the shooting page. Correspondingly, when detecting the horizontal slide operation of the user, the electronic device determines that the target slide operation acting on the main display region of the current display page is received, controls each control in the horizontal control queue to move synchronously along the sliding direction of the target slide operation until the target slide operation ends, and determines the control located at the trigger position of the control region when the target slide operation ends to be the target control.

When multiple controls in the horizontal control queue are moved synchronously, exemplarily, when the target slide operation is the slide operation to the right, multiple controls in the horizontal control queue may be moved synchronously to the right; and when the target slide operation is the slide operation to the left, multiple controls in the horizontal control queue may be moved synchronously to the left. When multiple controls in the horizontal control queue are moved synchronously, a moving speed of the multiple controls may be a preset fixed speed or may be a speed determined according to a sliding speed and/or a sliding distance of the target slide operation. In this embodiment, the moving speed of the controls is not limited.

To improve the convenience of the slide operation of the user, when an angle between the slide operation performed by the user in the main display region of the current display page and a horizontal boundary line of the screen of the electronic device are less than or equal to a preset angle (such as 10° or 15°), the electronic device may determine that the slide operation performed by the user is the horizontal slide operation. In the case where the sliding distance of the target slide operation is too short, for example, in the case where the sliding distance of the target slide operation is lower than a preset distance threshold, when it is detected that the target slide operation ends, for example, when it is detected that a touch point corresponding to the target slide operation disappears, the position of each control in the horizontal control queue is restored to the original position before the move, that is, each control is moved back to the original position before the move, thereby reducing the occurrence of false triggering.

In this embodiment, the number of effect controls of recommended effects included in the horizontal control queue may be set as required, for example, may be set to 10, 20, 30, or the like. The recommended effects may be understood as recommended video effects of the video of the user and may be determined according to a preset recommendation parameter. The preset recommendation parameter may include at least one of the gender of the user, the camera turned on by the user, or the evaluation and the number of times of use of each effect by the user or other users. For example, the preset recommendation parameter may include the gender of the user and the camera turned on by the user so that the determined recommended effect can better satisfy the use intention of the user. The method for switching effects provided in this embodiment may further include determining the recommended effects according to the preset recommendation parameter, where the preset recommendation parameters include type information of a camera currently turned on by the electronic device and/or gender information of the user. The type information of the camera currently turned on by the electronic device may be the front camera or the rear camera; and the gender information of the user may be male or female.

Exemplarily, every time the electronic device switches to the shooting page or when the electronic device detects that the camera switches or the gender of the user changes, the electronic device may acquire the type information of the camera currently turned on and the gender information of the user and select a set number of effects that match the type information and the gender information as the recommended effects. For example, multiple effects set by the application program may be pre-divided into four effect groups, that is, effects suitable for female scenarios of the front camera, effects suitable for male scenarios of the front camera, effects suitable for female scenarios of the rear camera, and effects suitable for male scenario of the rear camera, and a set number of effects are directly selected among an effect group that matches with the type information of the camera turned on at a current moment and the gender information of the user as the recommended effects.

Face recognition is performed on an image acquired by the camera so as to obtain the gender of the user. When multiple faces exist in the image acquired by the camera, a face with the largest face area in the image may be determined to be the face of the user and the gender is recognized, or the gender with the largest number of faces is determined to be the gender of the user; and when no face exists in the image acquired by the camera, the gender of the user may be determined based on a historical gender recognition result, where if no historical gender identification result exists (that is, the first time the user uses the application program), the gender of the user may be determined to be a pre-set default gender (such as male or female).

Figure 6:
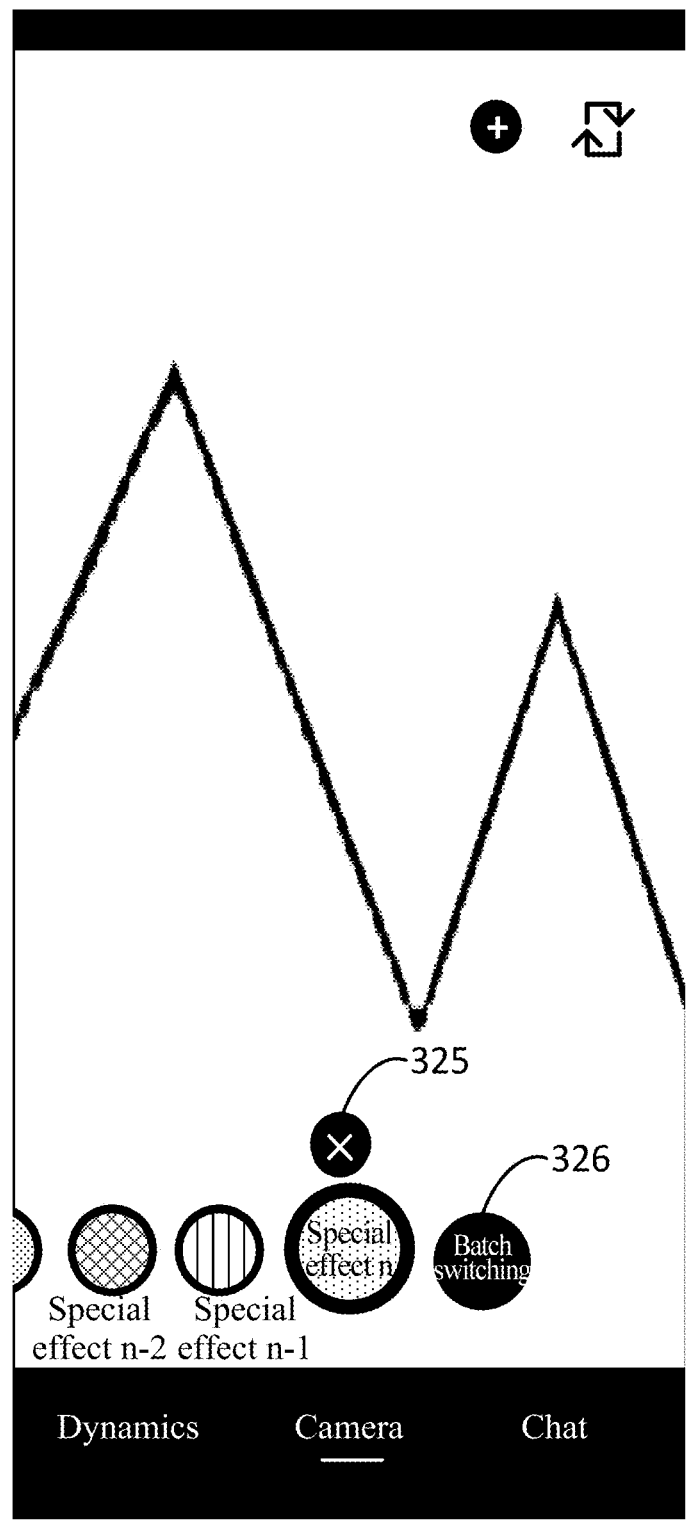
FIG. 6 is a schematic view of another shooting page according to an embodiment of the present disclosure.

In this embodiment, as shown in FIG. 6, to facilitate the operation of the user, in the case where the target control is not the main shooting control, after the target control is moved to the trigger position of the control region, a close control 325 may also be displayed at a set position of the target control so that when it is detected that the user clicks on the close control 325, each control in the horizontal control queue is moved synchronously until the main shooting control is moved to the trigger position of the control region.

In S103, in the case where the target control is the effect control, a shooting page is displayed, a preview of a target effect corresponding to the target control is displayed on the shooting page, and when a first trigger operation acting on the trigger position is detected, shooting is performed by using the target effect; and the operation ends.

In the case where the target control is the effect control, if the current control is the main shooting control, that is, no effect is added to the shooting page, the target recommended effect corresponding to the target control may be added to the shooting page; and if the current control is the effect control, the original recommended effect added to the shooting page may be removed and the target recommended effect corresponding to the target control is added to the shooting page. In the case where the target control is the main shooting control, the original recommended effect added to the shooting page may be removed. In this manner, when the current control is the effect control, the original recommended effect added to the shooting page may be removed so that the target recommended effect corresponding to the target control is added to the shooting page.

In S104, in the case where the target control is the main shooting control, the shooting page is displayed, and when a second trigger operation acting on the trigger position is detected, shooting is performed.

In the case where the target control is the main shooting control, a current interface may be controlled to display the shooting page, the trigger operation may be continuously detected, and when the second trigger operation acting on the trigger position is detected, shooting is performed in the related region.

This embodiment provides a shooting method. A current display page is displayed and a main shooting control and at least two effect controls for recommending effects are displayed in a control region of the current display page. When a target slide operation acting on a main display region of the current display page is received, each control displayed in the control region are moved along a sliding direction of the target slide operation, so as to determine a control located at a trigger position of the control region to be a target control when an end of the target slide operation is detected. If the target control is the effect control, a shooting page is displayed, a preview of a target effect corresponding to the target control is displayed on the shooting page, and when a first trigger operation acting on the trigger position is detected, shooting is performed by using the target effect. If the target control is the main shooting control, the shooting page is displayed, and when a second trigger operation acting on the trigger position is detected, shooting is performed. This method is adopted. In this manner, the user only needs to perform the slide operation in the main display region of the shooting page to switch effects previewed on the shooting page so that shooting is performed by using the effect without the need for multiple click operations, thereby simplifying an operation required for switching effects and improving the convenience of switching the effects.

Figure 7:
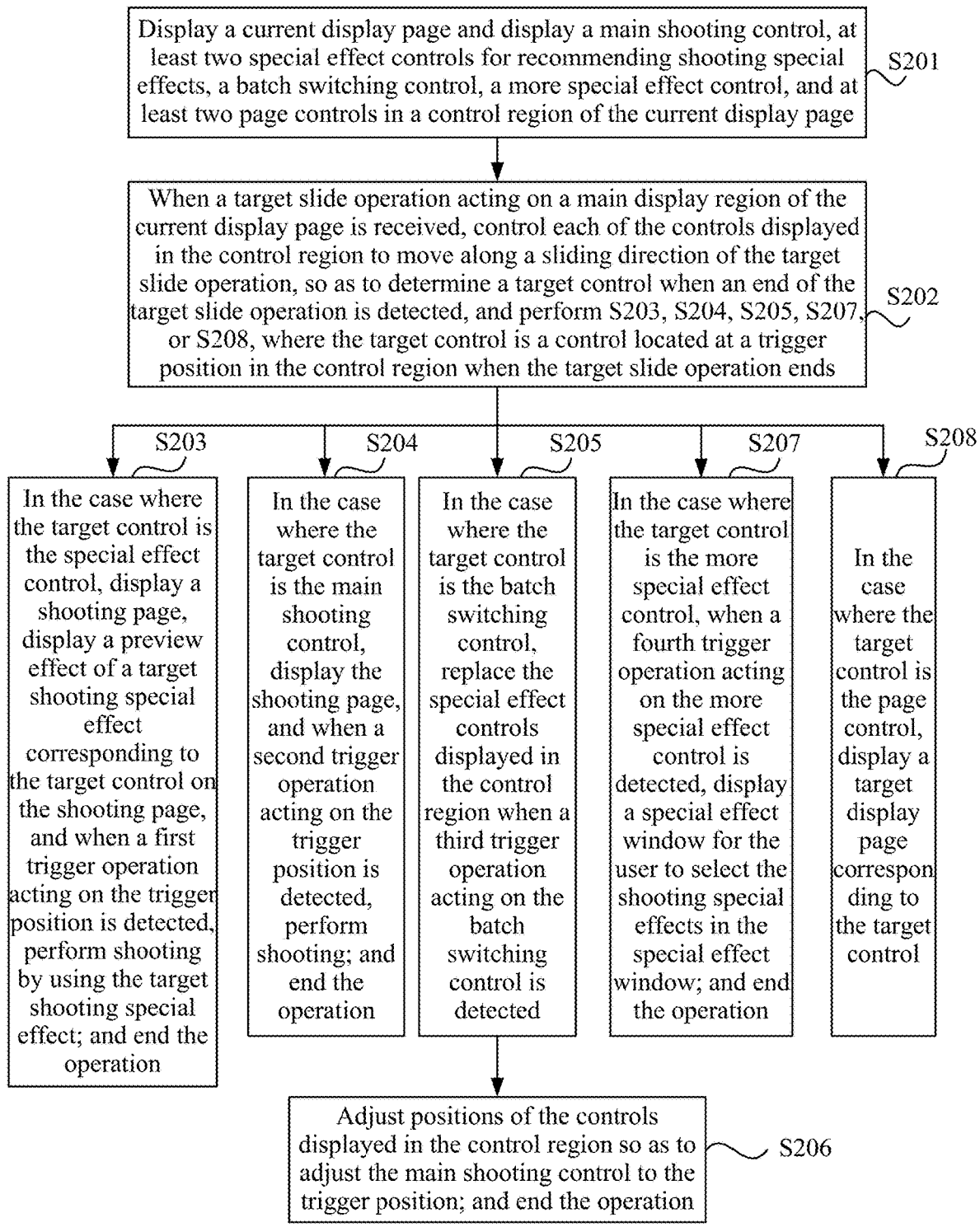
FIG. 7 is a flowchart of another shooting method according to an embodiment of the present disclosure.

FIG. 7 is a flowchart of another shooting method according to an embodiment of the present disclosure. The solution in this embodiment may be combined with one or more optional solutions in the preceding embodiments.

In this embodiment, optionally, a batch switching control is further displayed in the control region; and the method further includes in the case where the target control is the batch switching control, replacing the effect controls displayed in the control region when a third trigger operation acting on the batch switching control is detected.

Optionally, after the effect controls displayed in the control region are replaced, the method further includes adjusting positions of the controls displayed in the control region to adjust the main shooting control to the trigger position.

Optionally, a more effect control is further displayed in the control region; and the method further includes in the case where the target control is the more effect control, when a fourth trigger operation acting on the more effect control is detected, displaying an effect window for the user to select the effects in the effect window.

Optionally, at least two page controls for displaying pages are further displayed in the control region; and the method further includes in the case where the target control is one of the at least two page controls, displaying a target display page corresponding to the target control.

Correspondingly, as shown in FIG. 7, the shooting method provided in this embodiment may include steps described below.

In S201, a current display page is displayed and a main shooting control, at least two effect controls for recommending effects, a batch switching control, a more effect control, and at least two page controls are displayed in a control region of the current display page.

The at least two page controls are a control for instructing the electronic device to switch the current display page to the corresponding display page of the application program, a photo album control for instructing the electronic device to switch the current display page to the local photo album page, a shooting-the-same control for instructing the electronic device to switch the current display page to the shooting-the-same page, an album control for instructing the electronic device to switch the current display page to the My Album page, and other controls. When detecting that a page control is located at the trigger position of the control region or detecting that the user clicks on a page control, the electronic device switches the current display page to a display page corresponding to this page control.

To facilitate distinction and switching, the effect controls and the page controls may be located on two sides corresponding to the main shooting control. For example, the effect controls may be located above (or below) the main shooting control, and the page controls may be located below (or above) the main shooting control; correspondingly, the target slide operation may be a vertical slide operation. Alternatively, the effect controls may be located on the right side (or left side) of the main shooting control, and the page controls may be located on the left side (or right side) of the main shooting control; correspondingly, the target slide operation may be the horizontal slide operation. As shown in FIG. 2, the case where page controls 323 are located on the left side of the main shooting control 321 and the effect controls 322 are located on the right side of the main shooting control 321 is used as an example for description. The page controls 323, the main shooting control 321, and the effect controls 322 form the horizontal control queue. This horizontal control queue includes all controls set in the control region 32 by the application program. In the case where the number of the controls included in the horizontal control queue is relatively large, some controls in the horizontal control queue may be located outside a display range of the screen of the electronic device.

Figure 8:
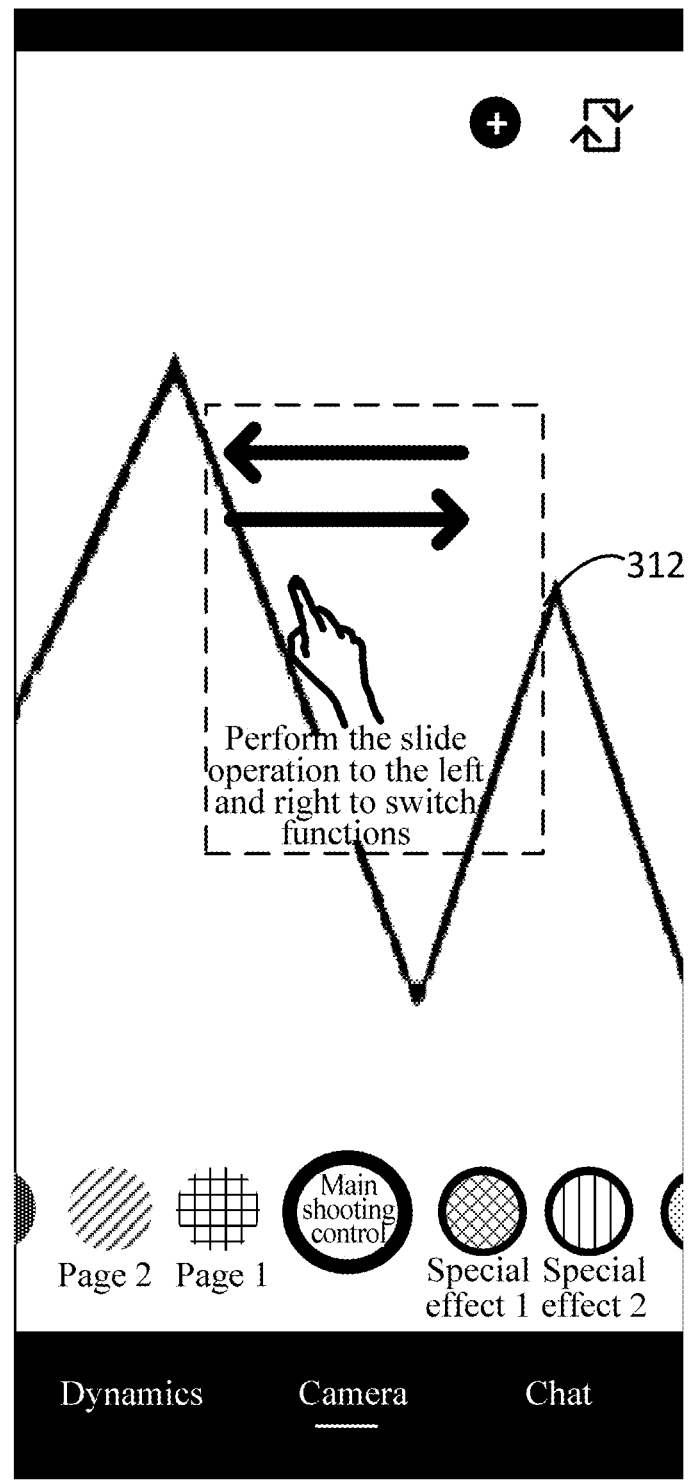
FIG. 8 is a schematic view of slide prompt information according to an embodiment of the present disclosure.

In an embodiment, in order that the user understands that the application program performs function switching, for example, effect switching and/or page switching, by the slide operation, as shown in FIG. 8, when the user enters the shooting page for the first time, slide prompt information 312 may be displayed in the main display region so that the user may perform the effect switching or page switching through the target slide operation when switching is needed. The current display page is the shooting page, and after the current display page is displayed and the main shooting control, the at least two effect controls for recommending the effects, and the at least two page controls for displaying pages are displayed in the control region of the current display page, the method further includes: if the shooting page displayed this time is displayed for the first time, the slide prompt information is displayed on the shooting page to prompt the user to perform the target slide operation in the main display region of the shooting page.

In S202, when a target slide operation acting on a main display region of the current display page is received, each of the controls displayed in the control region is moved along a sliding direction of the target slide operation, so as to determine a target control when an end of the target slide operation is detected. Then, S203, S204, S205, S207, or S208 is performed. The target control is a control located at a trigger position in the control region when the target slide operation ends.

In S203, in the case where the target control is the effect control, a shooting page is displayed, a preview of a target effect corresponding to the target control is displayed on the shooting page, and when a first trigger operation acting on the trigger position is detected, shooting is performed by using the target effect; and the operation ends.

In S204, in the case where the target control is the main shooting control, the shooting page is displayed, and when a second trigger operation acting on the trigger position is detected, shooting is performed; and the operation ends.

In S205, in the case where the target control is the batch switching control, the effect controls displayed in the control region are replaced when a third trigger operation acting on the batch switching control is detected.

Exemplarily, referring to FIG. 6 (FIG. 6 only shows the case where a batch switching control 326 is located at the right end of the horizontal control queue), the batch switching control 326 may be used for instructing the electronic device to replace the effect controls displayed in the control region and may be located at an end of the horizontal control queue adjacent to the effect controls, that is, in the case where the effect controls are located on the right side of the main shooting control, the batch switching control 326 may be located at the right end of the horizontal control queue; and in the case where the effect controls are located on the left side of the main shooting control, the batch switching control 326 may be located at the left end of the horizontal control queue. The third trigger operation may be any operation that can trigger the batch switching control, such as an operation of clicking on the batch switching control 326 or an operation of moving the batch switching control 326 to the trigger position of the control region.

Exemplarily, when the user wants to replace the controls in the horizontal control queue, the user may perform the slide operation in the main display region of the current display page to move the batch switching control to the trigger position of the control region, or the user may click on the batch switching control. Correspondingly, when detecting that the batch switching control is moved from other positions to the trigger position or detecting that the user clicks on the batch switching control, the electronic device determines that the third trigger operation acting on the batch switching control is received so that the effect added to the shooting page is removed, other acquired effects that match a current preset recommendation parameter and whose effect controls are not located in the horizontal control queue are determined to be newly recommended effects, and the original effect controls in the horizontal control queue are replaced with effect controls of the determined newly recommended effects.

In S206, positions of the controls displayed in the control region are adjusted so as to adjust the main shooting control to the trigger position; and the operation ends.

In order that the user switches the effects, after the effect controls in the control region are replaced, the main shooting control may also be adjusted to a preset trigger position, which is convenient for the user to check.

In S207, in the case where the target control is the more effect control, when a fourth trigger operation acting on the more effect control is detected, an effect window is displayed for the user to select the effects in the effect window; and the operation ends.

Figure 9:
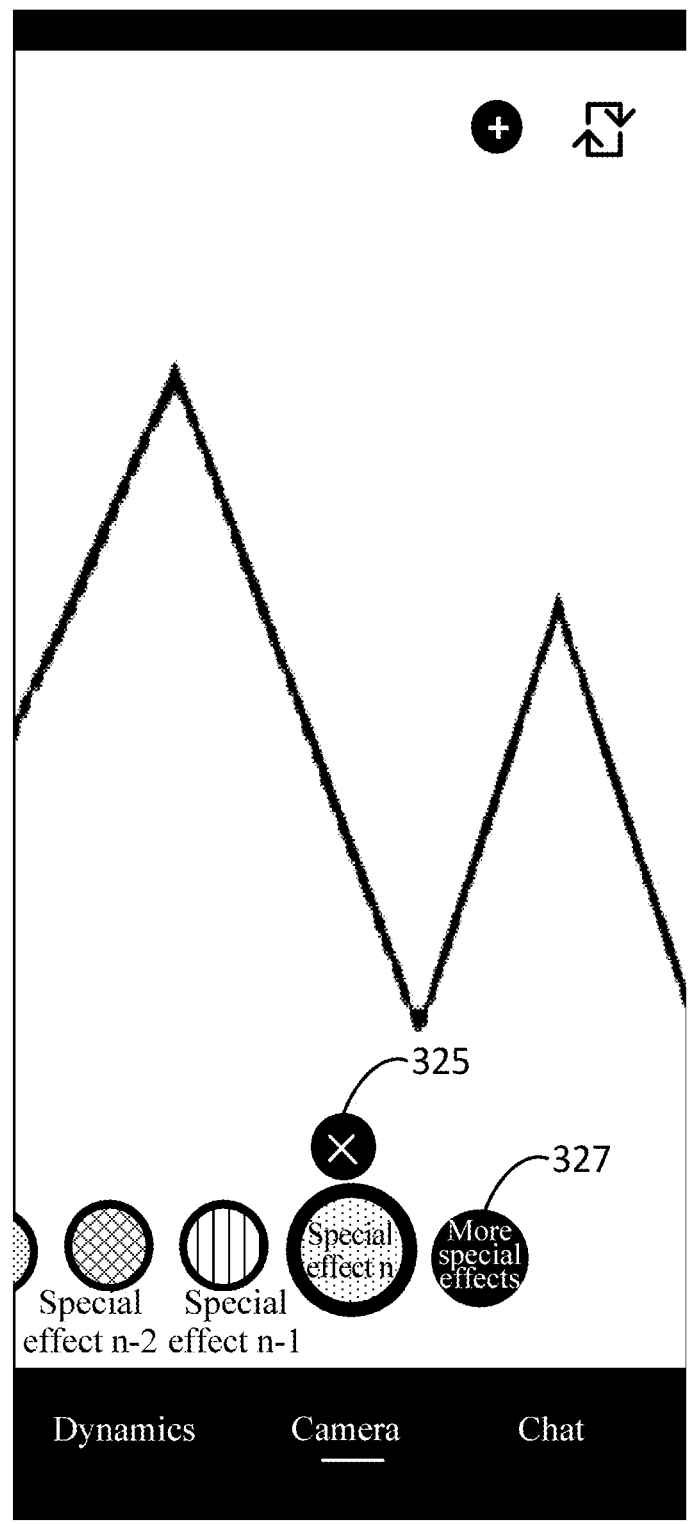
FIG. 9 is a schematic view of another shooting page according to an embodiment of the present disclosure.

In the preceding embodiments, referring to FIG. 9 (FIG. 9 only shows the case where a more effect control 327 is located at the right end of the horizontal control queue), the more effect control 327 may be used for instructing the electronic device to display the effect window and may be located at an end of the horizontal control queue adjacent to the effect controls, that is, in the case where the effect controls are located on the right side of the main shooting control, the more effect control 327 may be located at the right end of the horizontal control queue; and in the case where the effect controls are located on the left side of the main shooting control, the more effect control 327 may be located at the left end of the horizontal control queue. The fourth trigger operation may be any operation that can trigger the more effect control 327, such as an operation of clicking on the more effect control 327 or an operation of moving the more effect control 327 to the trigger position of the control region.

Figure 10:
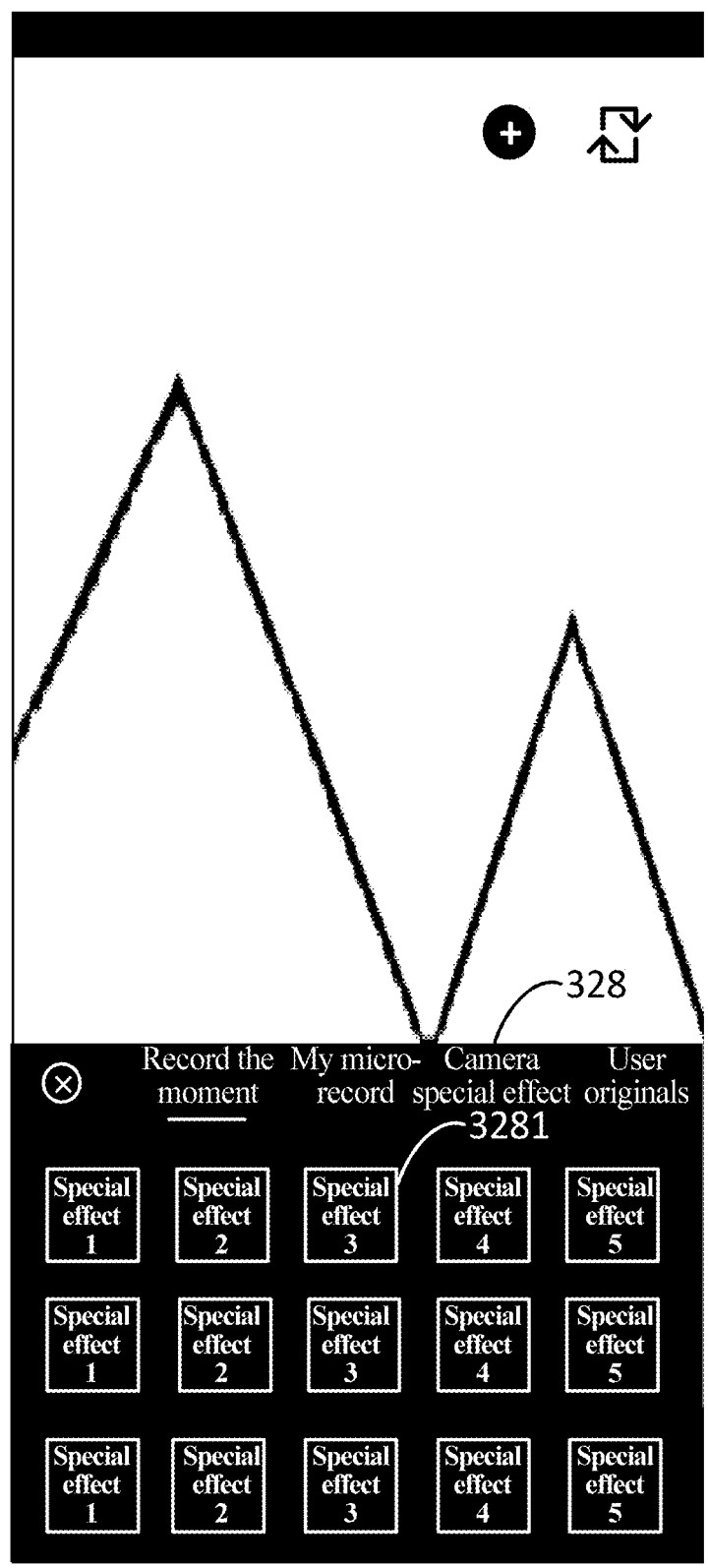
FIG. 10 is a schematic view of an effect window according to an embodiment of the present disclosure.

Exemplarily, when the user wants to select the effects from the effect window, the user may perform the slide operation in the main display region of the current display page to move the more effect control to the trigger position of the control region, or the user may click on the more effect control. Correspondingly, when detecting that the more effect control is moved from other positions to the trigger position or detecting that the user clicks on the more effect control, the electronic device determines that the fourth trigger acting on the more effect control is received so that the effect added to the shooting page is removed, an effect window 328 pops up, at least two effect icons 3281 of effects set by the application program are displayed in the effect window 328 as shown in FIG. 10, and when it is detected that the user clicks on an effect icon 3281 displayed in the effect window 328, the effect added to the shooting page is replaced with the effect corresponding to the effect icon 3281 that the user clicks on.

In S208, in the case where the target control is the page control, a target display page corresponding to the target control is displayed.

The target display page is a display page corresponding to the target control; and the target display page corresponding to the main shooting control is the shooting page without any effects.

In the case where the current display page is a non-shooting page or in the case where the current display page is the shooting page and the target control is the page control, the page switching may be performed so as to switch the current display page of the application program to the target display page corresponding to the target control. In the case where no target control does not exist, that is, in the case where the current control is the leftmost control in the horizontal control queue and the target control determined according to the target slide operation is located on the left side of the current control, or in the case where the current control is the rightmost control in the horizontal control queue and the target control determined according to the target slide operation is located on the right side of the current control, the target slide operation may not be responded.

In this embodiment, the user may perform the page switching and/or effect switching through the target slide operation. For example, the effect controls are located on the right side of the main shooting control, and the page controls are located on the left side of the main shooting control. In the case where the main shooting control is located at the trigger position of the control region, referring to FIG. 2, the user performs the slide operation to the left on the current display page for multiple times, thereby switching the effects added to the shooting page; and the user performs the slide operation to the right on the shooting page for multiple times, thereby switching the current display page. In the case where the page control is located at the trigger position of the control region, when the user performs the slide operation to the left on the current display page for multiple times, thereby switching the current display page and the effects; and the user performs the slide operation to the right on the current display page for multiple times, thereby switching the current display page. In the case where the effect control is located at the trigger position of the control region, when the user performs the slide operation to the left on the current display page for multiple times, thereby switching the effects; and the user performs the slide operation to the right on the current display page for multiple times, thereby switching the effects and the current display page.

In the shooting method provided in this embodiment, in the case where the target control is the batch switching control, the effect controls displayed in the control region are replaced when a third trigger operation acting on the batch switching control is detected; after the effect controls displayed in the control region are replaced, positions of the controls displayed in the control region are adjusted so as to adjust the main shooting control to the trigger position; a more effect control is further displayed in the control region, where in the case where the target control is the more effect control, when a fourth trigger operation acting on the more effect control is detected, an effect window is displayed for the user to select the effects in the effect window; and at least two page controls for displaying pages are further displayed in the control region, where in the case where the target control is the page control, a target display page corresponding to the target control is displayed. The current display page is the shooting page. After the current display page is displayed and the main shooting control and the at least two effect controls for recommending the effects are displayed in the control region of the current display page, in the case where the shooting page displayed this time is displayed for the first time, slide prompt information is displayed on the shooting page to prompt the user to perform the target slide operation in the main display region of the shooting page; and/or in the case where the shooting page displayed this time is displayed for the n-th time, camera switching prompt information is displayed on the shooting page to prompt the user to switch the camera to switch the effect controls in the control region, where n is a positive integer and n≥2. In this embodiment, the preceding technical solutions are adopted. In this manner, the user only needs to perform the slide operation in the main display region of the shooting page to switch effects previewed on the shooting page so that shooting is performed by using the effect without the need for multiple click operations, thereby simplifying an operation required for switching effects and improving the convenience of switching the effects.

Figure 11:
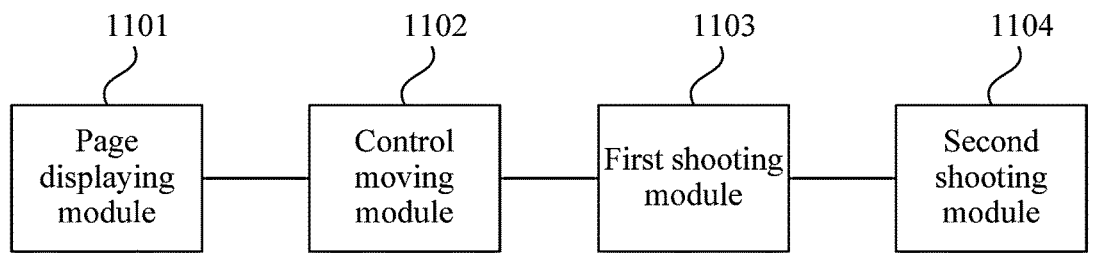
FIG. 11 is a structural diagram of a shooting apparatus according to an embodiment of the present disclosure.

FIG. 11 is a structural diagram of a shooting apparatus according to an embodiment of the present disclosure. The apparatus may be implemented by software and/or hardware and may be configured in an electronic device, for example, a smart phone or a tablet computer. This apparatus may switch effects by performing the shooting method. As shown in FIG. 11, the shooting apparatus provided in this embodiment may include a page displaying module 1101, a control moving module 1102, a first shooting module 1103, and a second shooting module 1104. The page displaying module 1101 is configured to display a current display page and display controls in a control region of the current display page, where the controls include a main shooting control and at least two effect controls for recommending effects. The control moving module 1102 is configured to, when a target slide operation acting on a main display region of the current display page is received, control each control displayed in the control region to move along a sliding direction of the target slide operation, so as to determine a target control when an end of the target slide operation is detected, where the target control is a control located at a trigger position in the control region when the target slide operation ends. The first shooting module 1103 is configured to, in the case where the target control is the effect control, display a shooting page, display a preview of a target effect corresponding to the target control on the shooting page, and when a first trigger operation acting on the trigger position is detected, perform shooting by using the target effect. The second shooting module 1104 is configured to, in the case where the target control is the main shooting control, display the shooting page, and when a second trigger operation acting on the trigger position is detected, perform shooting.

This embodiment provides the shooting apparatus. The page displaying module 1101 is configured to display a current display page and display a main shooting control and at least two effect controls for recommending effects in a control region of the current display page. The control moving module 1102 is configured to, when a target slide operation acting on a main display region of the current display page is received, control each control displayed in the control region to move along a sliding direction of the target slide operation, so as to determine a target control when an end of the target slide operation is detected, where the target control is a control located at a trigger position in the control region when the target slide operation ends. The first shooting module 1103 is configured to, in the case where the target control is the effect control, display a shooting page, display a preview of a target effect corresponding to the target control on the shooting page, and when a first trigger operation acting on the trigger position is detected, perform shooting by using the target effect. The second shooting module 1104 is configured to, in the case where the target control is the main shooting control, display the shooting page, and when a second trigger operation acting on the trigger position is detected, perform shooting. In this embodiment, the preceding technical solutions are adopted. In this manner, the user only needs to perform the slide operation in the main display region of the shooting page to switch effects previewed on the shooting page so that this effect is used to perform shooting without the need for multiple click operations, thereby simplifying an operation required for switching effects and improving the convenience of switching the effects.

A batch switching control is further displayed in the control region. The shooting apparatus may further include a control switching module configured to, in the case where the target control is the batch switching control, replace the effect controls displayed in the control region when a third trigger operation acting on the batch switching control is detected.

In the preceding solutions, the apparatus further includes a position adjustment module configured to, after the effect controls displayed in the control region are replaced, adjust positions of the controls displayed in the control region to adjust the main shooting control to the trigger position.

A more effect control is further displayed in the control region; and the shooting apparatus may further include a more effect presentation module configured to, when a fourth trigger operation acting on the more effect control is detected, display an effect window for the user to select the effects in the effect window.

At least two page controls for displaying pages are further displayed in the control region; and the page displaying module 1101 is further configured to, in the case where the target control is one of the at least two page controls, display a target display page corresponding to the target control.

The shooting apparatus may further include a shooting recommendation module configured to determine a recommended effect according to a preset recommendation parameter, where the preset recommendation parameter includes type information of a camera currently turned on by an electronic device and/or gender information of a user.

The shooting apparatus may further include an operation prompt module.

The operation prompt module includes a first prompt unit and/or a second prompt unit.

The first prompt unit is configured to, the current display page is the shooting page, and after the current display page is displayed and the main shooting control and the at least two effect controls for recommending the effects are displayed in the control region of the current display page, in the case where the shooting page displayed this time is displayed for a first time, display slide prompt information on the shooting page to prompt the user to perform the target slide operation in the main display region of the shooting page. The second prompt unit is configured to, the current display page is the shooting page, and after the current display page is displayed and the main shooting control and the at least two effect controls for recommending the effects are displayed in the control region of the current display page, in the case where the shooting page displayed this time is displayed for an n-th time, display camera switching prompt information on the shooting page to prompt the user to switch the camera to switch the at least two effect controls in the control region, where n is a positive integer and n≥2.

The shooting apparatus provided in the embodiments of the present disclosure may perform the shooting method provided in any embodiment of the present disclosure and has corresponding functional modules and effects corresponding to the executed shooting method. For technical details not described in detail in this embodiment, reference may be made to the shooting method according to any embodiment of the present disclosure.

Figure 12:
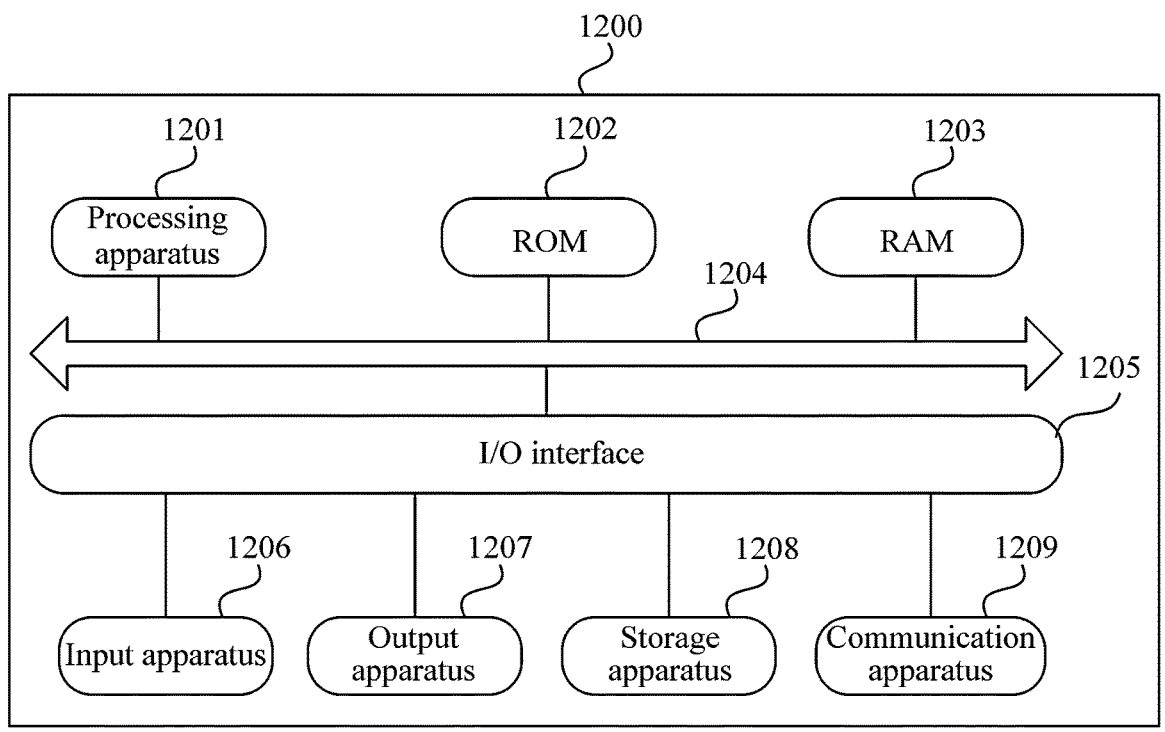
FIG. 12 is a structural diagram of an electronic device according to an embodiment of the present disclosure.

Referring to FIG. 12, FIG. 12 is a structural diagram of an electronic device (such as a terminal device) 1200 applicable to implementing the embodiments of the present disclosure. The terminal device in the embodiments of the present disclosure may include, but is not limited to, mobile terminals such as a mobile phone, a laptop, a digital broadcast receiver, a personal digital assistant (PDA), a portable Android device (PAD), a portable multimedia player (PMP) and an in-vehicle terminal (such as an in-vehicle navigation terminal), and stationary terminals such as a digital television (TV) and a desktop computer. The electronic device shown in FIG. 12 is merely an example and should not impose any limitation to the function and usage scope of the embodiments of the present disclosure.

As shown in FIG. 12, the electronic device 1200 may include a processing apparatus (such as a central processing unit and a graphics processing unit) 1201. The processing apparatus 1201 may execute multiple appropriate actions and processing according to a program stored in a read-only memory (ROM) 1202 or a program loaded into a random-access memory (RAM) 1203 from a storage apparatus 1208. The RAM 1203 also stores various programs and data required for the operation of the electronic device 1200. The processing apparatus 1201, the ROM 1202 and the RAM 1203 are connected to each other through a bus 1204. An input/output (I/O) interface 1205 is also connected to the bus 1204.

Generally, the following apparatus may be connected to the I/O interface 1205: a touch screen, a touch pad, a keyboard, a mouse, a camera, a microphone, an accelerometer, a gyroscope and other input apparatuses 1206; a liquid crystal display (LCD), a speaker, a vibrator and other output apparatuses 1207; a magnetic tape, a hard disk and other storage apparatuses 1208; and a communication apparatus 1209. The communication apparatus 1209 may allow the electronic device 1200 to perform wireless or wired communication with other devices to exchange data. FIG. 12 shows the electronic device 1200 having various apparatuses, but it is not necessary to implement or be equipped all the shown apparatuses. Alternatively, more or fewer apparatuses may be implemented or present.

According to the embodiments of the present disclosure, the process described above with reference to the flowchart may be implemented as a computer software program. For example, the embodiments of the present disclosure include a computer program product. The computer program product includes a computer program carried in a non-transitory computer-readable medium. The computer program includes program codes for executing the method shown in the flowchart. In such an embodiment, the computer program may be downloaded and installed from the network through the communication apparatus 1209, or may be installed from the storage apparatus 1208, or may be installed from the ROM 1202. When the computer program is executed by the processing apparatus 1201, the preceding functions defined in the methods of embodiments of the present disclosure are executed.

The computer-readable medium described above in the present disclosure may be a computer-readable signal medium or a computer-readable storage medium or any combination thereof. The computer-readable storage medium may be, but is not limited to, an electrical, magnetic, optical, electromagnetic, infrared, or semiconductor system, apparatus, or device, or any combination thereof. An example of the computer-readable storage medium may include, but is not limited to, an electrical connection having one or more wires, a portable computer magnetic disk, a hard disk, a RAM, a ROM, an erasable programmable read-only memory (EPROM), a flash memory, an optical fiber, a portable compact disc read-only memory (CD-ROM), an optical storage device, a magnetic storage device, or any suitable combination thereof. In the present disclosure, the computer-readable storage medium may be any tangible medium including or storing a program. The program may be used by or used in conjunction with an instruction execution system, apparatus, or device. In the present disclosure, the computer-readable signal medium may include a data signal propagated on a baseband or as a part of a carrier, and computer-readable program codes are carried in the data signal. The data signal propagated in this manner may be in multiple forms and includes, and is not limited to, an electromagnetic signal, an optical signal, or any suitable combination thereof. The computer-readable signal medium may further be any computer-readable medium other than the computer-readable storage medium. The computer-readable signal medium may send, propagate, or transmit the program used by or used in conjunction with the instruction execution system, apparatus, or device. The program codes included in the computer-readable medium may be transmitted in any suitable medium, including, but not limited to, a wire, an optical cable, a radio frequency (RF), or any suitable combination thereof.

In some embodiments, clients and servers may communicate using any currently known or future developed network protocol, such as the Hypertext Transfer Protocol (HTTP), and may be interconnected with any form or medium of digital data communication (for example, a communication network). Examples of the communication network include a local area network (LAN), a wide area network (WAN), an internet (for example, the Internet), a peer-to-peer network (for example, an Ad-Hoc network), and any network currently known or to be developed in the future.

The computer-readable medium may be included in the electronic device or may exist alone without being assembled into the electronic device.

The computer-readable medium carries one or more programs which, when executed by the electronic device, cause the electronic device to perform the following operations: displaying a current display page and displaying a main shooting control and at least two effect controls for recommending effects in a control region of the current display page; when a target slide operation acting on a main display region of the current display page is received, controlling each control displayed in the control region to move along a sliding direction of the target slide operation, so as to determine a target control when an end of the target slide operation is detected, where the target control is a control located at a trigger position in the control region when the target slide operation ends; in the case where the target control is the effect control, displaying a shooting page, displaying a preview of a target effect corresponding to the target control on the shooting page, and when a first trigger operation acting on the trigger position is detected, performing shooting by using the target effect; and in the case where the target control is the main shooting control, displaying the shooting page, and when a second trigger operation acting on the trigger position is detected, performing shooting.

Computer program codes for performing the operations in the present disclosure may be written in one or more programming languages or a combination thereof. The preceding one or more programming languages include, but are not limited to, object-oriented programming languages such as Java, Smalltalk and C++, as well as conventional procedural programming languages such as C or similar programming languages. Program codes may be executed entirely on a user computer, partly on a user computer, as a stand-alone software package, partly on a user computer and partly on a remote computer, or entirely on a remote computer or a server. In the scenario involving the remote computer, the remote computer may be connected to the user computer through any type of network, including a LAN or a WAN, or the connection may be made to an external computer (for example, through the Internet using an Internet service provider).

The flowcharts and block diagrams in the drawings show possible architectures, functions and operations of the system, method and computer program product according to multiple embodiments of the present disclosure. In this regard, each block in the flowcharts or block diagrams may represent a module, a program segment, or part of codes that contains one or more executable instructions for implementing specified logical functions. It is also to be noted that in some alternative implementations, the functions marked in the blocks may occur in an order different from those marked in the drawings. For example, two successive blocks may, in fact, be executed substantially in parallel or in a reverse order, which depends on the functions involved. It is also to be noted that each block of the block diagrams and/or flowcharts, and combinations of blocks in the block diagrams and/or flowcharts may be implemented by not only a specific-purpose hardware-based system that performs a specified function or operation, but also a combination of specific-purpose hardware and computer instructions.

The units involved in the embodiments of the present disclosure may be implemented by software or hardware. The name of a module is not intended to limit the module in a circumstance.

The functions described above herein may be executed, at least partially, by one or more hardware logic components. For example, without limitation, exemplary types of hardware logic components that may be used include: a field programmable gate array (FPGA), an application specific integrated circuit (ASIC), application specific standard parts (ASSP), a system on a chip (SOC), a complex programmable logic device (CPLD) and the like.

In the context of the present disclosure, the machine-readable medium may be a tangible medium that may include or store a program used by or used in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. Examples of the machine-readable storage medium may include an electrical connection based on one or more wires, a portable computer disk, a hard disk, a RAM, a ROM, an EPROM, a flash memory, an optical fiber, a CD-ROM, an optical storage device, a magnetic storage device, or any suitable combination thereof.

According to one or more embodiments of the present disclosure, example 1 provides a shooting method including steps described below.

A current display page is displayed and a main shooting control and at least two effect controls for recommending effects are displayed in a control region of the current display page; when a target slide operation acting on a main display region of the current display page is received, each control displayed in the control region is moved along a sliding direction of the target slide operation, so as to determine a target control when an end of the target slide operation is detected, where the target control is a control located at a trigger position in the control region when the target slide operation ends; in the case where the target control is the effect control, a shooting page is displayed, a preview of a target effect corresponding to the target control is displayed on the shooting page, and when a first trigger operation acting on the trigger position is detected, shooting is performed by using the target effect; and in the case where the target control is the main shooting control, the shooting page is displayed, and when a second trigger operation acting on the trigger position is detected, shooting is performed.

According to one or more embodiments of the present disclosure, in example 2, according to the method described in example 1, a batch switching control is further displayed in the control region; and the method further includes a step described below.

In the case where the target control is the batch switching control, the effect controls displayed in the control region are replaced when a third trigger operation acting on the batch switching control is detected.

According to one or more embodiments of the present disclosure, in example 3, according to the method described in example 2, after the effect controls displayed in the control region are replaced, the method further includes a step described below.

Positions of the controls displayed in the control region are adjusted so as to adjust the main shooting control to the trigger position.

According to one or more embodiments of the present disclosure, in example 4, according to the method described in example 1, a more effect control is further displayed in the control region; and the method further includes a step described below.

In the case where the target control is the more effect control, when a fourth trigger operation acting on the more effect control is detected, an effect window is displayed for a user to select the effects in the effect window.

According to one or more embodiments of the present disclosure, in example 5, according to the method described in example 1, at least two page controls for displaying pages are further displayed in the control region; and the method further includes a step described below.

In the case where the target control is one of the at least two page controls, a target display page corresponding to the target control is displayed.

According to one or more embodiments of the present disclosure, in example 6, according to the method described in any one of examples 1 to 5, the method further includes a step described below.

A recommended effect is determined according to a preset recommendation parameter, where the preset recommendation parameter includes type information of a camera currently turned on by an electronic device and/or gender information of a user.

According to one or more embodiments of the present disclosure, in example 7, according to method described in example 6, the current display page is the shooting page; and after the current display page is displayed and the main shooting control and the at least two effect controls for recommending the effects are displayed in the control region of the current display page, the method further includes steps described below.

In the case where the shooting page displayed this time is displayed for a first time, slide prompt information is displayed on the shooting page to prompt the user to perform the target slide operation in the main display region of the shooting page; and/or in the case where the shooting page displayed this time is displayed for an n-th time, camera switching prompt information is displayed on the shooting page to prompt the user to switch the camera to switch the at least two effect controls in the control region, where n is a positive integer and n≥2.

According to one or more embodiments of the present disclosure, example 8 provides a shooting apparatus. The apparatus includes a page displaying module, a control moving module, a first shooting module, and a second shooting module.

The page displaying module is configured to display a current display page and display a main shooting control and at least two effect controls for recommending effects in a control region of the current display page. The control moving module is configured to, when a target slide operation acting on a main display region of the current display page is received, control each control displayed in the control region to move along a sliding direction of the target slide operation, so as to determine a target control when an end of the target slide operation is detected, where the target control is a control located at a trigger position in the control region when the target slide operation ends. The first shooting module is configured to, in the case where the target control is the effect control, display a shooting page, display a preview of a target effect corresponding to the target control on the shooting page, and when a first trigger operation acting on the trigger position is detected, perform shooting by using the target effect. The second shooting module is configured to, in the case where the target control is the main shooting control, display the shooting page, and when a second trigger operation acting on the trigger position is detected, perform shooting.

According to one or more embodiments of the present disclosure, example 9 provides an electronic device. The electronic device includes one or more processors and a memory configured to store one or more programs.

The one or more programs, when executed by the one or more processors, cause the one or more processors to perform the shooting method of any one of examples 1 to 7.

According to one or more embodiments of the present disclosure, example 10 provides a computer-readable storage medium storing a computer program which, when executed by a processor, causes the processor to perform the shooting method of any one of examples 1 to 7.

Additionally, although multiple operations are described in a particular order, it is not a must to perform these operations in this particular order or in sequential order. In certain circumstances, multitasking and parallel processing may be advantageous. Similarly, although multiple implementation details are included in the preceding discussion, these should not be construed as limiting the scope of the present disclosure. Some features described in the context of separate embodiments may be implemented in combination in a single embodiment. Rather, features described in the context of a single embodiment may be implemented in multiple embodiments individually or in any suitable subcombination.

What is claimed is:

1. A shooting method, comprising:
    displaying a shooting page comprising a control region and a main display region, wherein the control region is used to display controls comprising at least two effect controls, a more effect control, and a main shooting control, the at least two effect controls correspond to recommended effects according to a preset recommendation parameter which comprises at least one piece of information of a camera and a user;

in response to a target slide operation in the main display region, moving the controls in the control region along a sliding direction of the target slide operation, determining a target control which is located at a trigger position in the control region according to the target slide operation, wherein the trigger position is a sub-region in the control region;

in response to the target control being one of the at least two effect controls, displaying a preview of a target effect corresponding to the target control on the shooting page, and performing capturing using the target effect in response to a first trigger operation on the trigger position; and in response to the target control being the more effect control and a second trigger operation on the trigger position, displaying an effect interface with more effects for the user to select.

2. The method of claim 1, wherein a batch switching control is further displayed in the control region and the method further comprises:

in response to the target control being the batch switching control and a third trigger operation on the batch switching control, replacing the at least two effect controls displayed in the control region.

3. The method of claim 2, wherein after the at least two effect controls displayed in the control region are replaced, the method further comprises:

adjusting positions of the controls displayed in the control region to move the main shooting control to the trigger position.

4. The method of claim 1, wherein at least two page controls for displaying pages are further displayed in the control region and the method further comprises:

in response to the target control being one of the at least two page controls, displaying a target display page corresponding to the target control.

5. The method of claim 1, after the shooting page is displayed, further comprising:

in a case where the shooting page displayed is displayed for an n-th time, displaying camera switching prompt information on the shooting page to prompt the user to switch the at least two effect controls in the control region through switching the camera, wherein n is a positive integer and n≥2.

6. An electronic device, comprising:

at least one processor; and a memory configured to store at least one program;

wherein the at least one program, when executed by the at least one processor, causes the at least one processor to perform:

displaying a shooting page comprising a control region and a main display region, wherein the control region is used to display controls comprising at least two effect controls, a more effect control, and a main shooting control, the at least two effect controls correspond to recommended effects according to a preset recommendation parameter which comprises at least one piece of information of a camera and a user;

in response to a target slide operation in the main display region, moving the controls in the control region along a sliding direction of the target slide operation, determining a target control which is located at a trigger position in the control region according to the target slide operation, wherein the trigger position is a sub-region in the control region;

in response to the target control being one of the at least two effect controls, displaying a preview of a target effect corresponding to the target control on the shooting page, and performing capturing using the target effect in response to a first trigger operation on the trigger position; and in response to the target control being the more effect control and a second trigger operation on the trigger position, displaying an effect interface with more effects for the user to select.

7. The electronic device of claim 6, wherein a batch switching control is further displayed in the control region and the at least one processor is further configured to:

in response to the target control being the batch switching control and a third trigger operation on the batch switching control, replace the at least two effect controls displayed in the control region.

8. The electronic device of claim 7, wherein after the at least two effect controls displayed in the control region are replaced, the at least one processor is further configured to:

adjust positions of the controls displayed in the control region to move the main shooting control to the trigger position.

9. The electronic device of claim 6, wherein at least two page controls for displaying pages are further displayed in the control region and the at least one processor is further configured to:

in response to the target control being one of the at least two page controls, display a target display page corresponding to the target control.

10. The electronic device of claim 6, wherein the at least one processor is further configured to perform:

in a case where the shooting page displayed is displayed for an n-th time, displaying camera switching prompt information on the shooting page to prompt the user to switch the at least two effect controls in the control region through switching the camera, wherein n is a positive integer and n≥2.

11. A non-transitory computer-readable storage medium storing a computer program which, when executed by a processor, causes the processor to perform:

displaying a shooting page comprising a control region and a main display region, wherein the control region is used to display controls comprising at least two effect controls, a more effect control, and a main shooting control, the at least two effect controls correspond to recommended effects according to a preset recommendation parameter which comprises at least one piece of information of a camera and a user;

in response to a target slide operation in the main display region, moving the controls in the control region along a sliding direction of the target slide operation, determining a target control which is located at a trigger position in the control region according to the target slide operation, wherein the trigger position is a sub-region in the control region;

in response to the target control being one of the at least two effect controls, displaying a preview of a target effect corresponding to the target control on the shooting page, and performing capturing using the target effect in response to a first trigger operation on the trigger position; and in response to the target control being the more effect control and a second trigger operation on the trigger position, displaying an effect interface with more effects for the user to select.

12. The non-transitory computer-readable storage medium of claim 11, wherein a batch switching control is further displayed in the control region and the processor is further configured to:
  in response to the target control being the batch switching control and a third trigger operation on the batch switching control, replace the at least two effect controls displayed in the control region.

13. The non-transitory computer-readable storage medium of claim 12, wherein after the at least two effect controls displayed in the control region are replaced, the processor is further configured to:
  adjust positions of the controls displayed in the control region to adjust the main shooting control to the trigger position.

14. The non-transitory computer-readable storage medium of claim 11, wherein at least two page controls for displaying pages are further displayed in the control region and the processor is further configured to:
  in response to the target control being one of the at least two page controls, display a target display page corresponding to the target control.

\* \* \* \* \*